under_000ed States Patent [19]

Lugosi et al.

[11] 4,224,267
[45] Sep. 23, 1980

[54] WIRE, ROD, STICK, AND THE LIKE, WITH OR WITHOUT FLUXING AGENT FOR WELDING APPLICATIONS

[75] Inventors: Robert Lugosi, Monroeville; Gerald G. Lessmann, Pleasant Hills; Alan T. Male, Murrysville; Richard A. LaFave, Monroeville, all of Pa.

[73] Assignee: Westinghouse Electric Corp., Pittsburgh, Pa.

[21] Appl. No.: 891,089

[22] Filed: Mar. 28, 1978

[51] Int. Cl.$^2$ ............................................. B22F 1/00
[52] U.S. Cl. .................................... 264/111; 264/122
[58] Field of Search ....................... 264/111, 118, 122

[56] References Cited

U.S. PATENT DOCUMENTS 2,155,651  4/1939  Goetzel ................................. 264/111
2,708,770  5/1955  Herres et al.
3,757,410  9/1973  Roberts ................................. 264/111

Primary Examiner—Donald J. Arnold
Assistant Examiner—James R. Hall
Attorney, Agent, or Firm—C. M. Lorin

[57] ABSTRACT

An improved wire, rod, stick, and the like to be stored, packaged, transported, and fed into welding apparatus is manufactured so that the ultimate alloying stage is performed when used as filler material, or consumable electrode during welding operation. The wire, rod, stick, according to the invention, which may be with or without fluxing agent, is obtained by selecting constituents in relation to a desired alloy system, mixing the selected constituents, and forming a wire, rod or stick cold working, or by extrusion, the alloy system being obtained at the ultimate welding step with the intermediary wire, rod or stick.

3 Claims, 5 Drawing Figures

WIRE, ROD, STICK, AND THE LIKE, WITH OR WITHOUT FLUXING AGENT FOR WELDING APPLICATIONS

BACKGROUND OF THE INVENTION

The invention relates to a welding wire, rod, stick, or the like, of novel microstructural configuration, and to techniques for its manufacture.

It is known that by extrusion, rolling or squeezing, and more generally by hot or cold working, two metals of the same or different kind, can be joined together. It is also known that particulated matter can be compacted under pressure so as to become a unitary mass or body.

The present invention essentially relates to a novel microstructural configuration for a filler wire, rod, or stick typically used in welding operations. It consists of an elongated member of material of a precise and required composition which is melted by the applied heat in the course of the welding operation so that a bead of molten material is progressively yielded to fill the gap along the welding line. Three factors are of importance for such filler materials.

(1) The filler material must have a precise chemical composition in order to properly unite the two parts of the workpiece to be welded and form a seam when consumed.

(2) The material melted by the welding heat source must be a metal alloy of precise composition and structure.

(3) The filler wire must have the required cross-section, and be of a length sufficient to be fed regularly by the operator and supply the desired amount of filler along the seam. A correlative requirement is that the wire, rod, or stick have sufficient mechanical strength and ductibility to be packed, or wound, stored, transported and automatically fed by the welding apparatus.

In order to solve this problem, the prior art in the context of a metal composition has taken two avenues: metallurgical or mechanical alloying.

Forming a rod, wire or stick by mechanical alloying consists in building a metal sheath around a core of particulated alloy by continuous rolling or in forming a ceramic coating with such particulated alloy by cold working or by extrusion around a core of wire.

Metallurgical alloying involves alloying in the initial melting stage to obtain the desired metal composition. The alloy thus formed is then cast into an ingot, and the ingot is hot-worked to form the rod. An ultimate cold-working step combined with annealing changes the rod into a wire. It is clear that the mechanical and metallurgical methods are complex and costly methods of fabricating welding filler wires.

The object of the present invention is to provide a simpler, less expensive, wire, rod and/or stick suitable for filler applications in welding processes.

The filler material, for certain welding applications requiring the addition of a flux to prevent oxidation and other chemical contamination at the welding seam, the wire, rod, stick, or the like according to the present invention may be a composite material including a fluxing agent.

It is known from U.S. Pat. No. 1,972,463 to make rods or wires containing the fluxing agent in a finely-dispersed state throughout the material. To this effect, mixtures of powdered metal and fluxing agent are sintered in suitable molds to be brought into the form of rods or wires for welding application. Metal powder is obtained from metal carbonyl and sintering is performed on the metal powder with the finely-divided flux by means of heat or mechanical pressure, or both, to form the wire without a melting operation. This patent merely reveals the problems encountered when a fluxing agent is added, since the agent should not melt at the early stage of forming the rod, or wire, and the particles of agent should be intimately embedded in what should be a rod or wire. Still, the production of such rod, or wire by merely agglomerating together under pressure a mixture of particulated materials, will not yield a high density composite metalic structure having on the one hand the required mechanical quality to become, as a welding wire, or rod a staple article, nor which can be easily fed in an automatic welding machine of the marketplace, nor which can be identified by its chemical composition and final alloy microstructure (e.g. after being consumed in the welding process). For these reasons, the prior art does not teach or suggest the filler wire, rod, stick, and the like, with or without fluxing agent. according to the present invention.

SUMMARY OF THE INVENTION

According to the present invention, a wire, rod, or stick, with or without fluxing agent, for a welding filler material is manufactured and formed without any alloying step. The required alloying step is performed in situ, e.g., in the molten pool during the welding operation where the filler material is being actually consumed. More specifically, the method according to the present invention includes the steps of selecting constituents of the wire, rod or stick in particulated form, blending such constituents to form a proportionate mixture thereof and compacting such mixture with sufficient mechanical pressure to form a wire, rod or stick of sufficient mechanical strength and flexibility to make it a welding filler.

It is understood that the selected, blended and compacted constituents in particulated form are not necessarily made of pure metal. They may be made of metal alloy. They may include two or more metals, two or more alloys, at least one metal with at least one alloy. The particulated constituents need not be all metals or alloys. The object being to prepare under mechanical pressure a composite body which will ultimately form a true alloy in the molten weld pool. Constituents in particulated form may be added as required to obtain the desired alloy system for the beads in the welding seam. For instance, an aluminum-silicon system may be intended. In such case, silicon in particulated form and with the required proportion will be added and mixed with particulated aluminum and then formed into a wire, rod, or stick.

It is known from U.S. Pat. No. 2,659,133 to form a composite metal body from a mixture of two or more particulate metals, such as magnesium and aluminum, and by the application of heat and pressure by extrusion to obtain a bar consisting of elongated particles and which exhibits mechanical properties somewhat similar to those of a similar alloy produced by conventional casting and fabrication techniques. p It is also known from U.S. Pat. No. 1,323,623 to compress fine particles of a single pure metal to form a coherent heavy wire and then to heat and draw such heavy wire in order to reduce it under heat to a dense metallic state. Such coarse wire is then drawn into a fine wire which will serve as a wire filament for incandescent lamp filaments. U.S. Pat. No. 2,651,952 also shows compressing and extruding powdered metal to form a continuous rod which is thereafter sintered into a rigid but not fully dense structure.

It is further shown by U.S. Pat. No. 2,708,770 how to make ingot sticks from consumable electrodes which are in sponge or powder form through compacting followed by arc melting to form the ingot.

In all of the aforementioned patent references, when extrusion or compacting is used, this is merely an additional or intermediary step which precedes or follows heat treatment. In none of these references is it taught to manufacture a welding filler obtained without heat treatment which at such stage can be packed, wound, stored, transported and/or marketed and which ultimately will yield an intended alloy microstructure.

PREFERRED EMBODIMENT OF THE INVENTION

Figure 1:
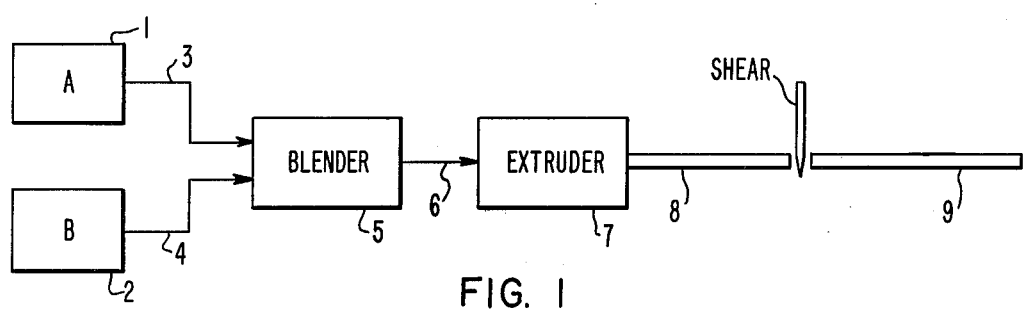
FIG. 1 illustrates in block diagram a mode of implementation of the method according to the present invention.

FIG. 1 shows schematically the process which can be used to implement the method according to the present invention. Two hoppers 1 and 2 containing particulated constituents A and B, respectively, are feeding, through corresponding feeding lines 3, 4, a blender 5. Blender 5 feeds through line 6 to, for example, an extruder 7 which provides at the output a continuous rod, or wire 8 having the proper overall characteristics to make it suitable for sale on the market and that can be used directly as a filler material in welding operations. The output wire or rod is cut by a shear to sever it to the required lengths. It is also possible to wind up the continuous wire around a reel (not shown) for storage and transportation, and that can be fed automatically by a welding apparatus.

Referring again to FIG. 1, the combination of a blender such as 5 and and extruder such as 7 is well known. Any type of blender and extruder can be used. Instead of an extruder, a rolling machine is applicable. Any means for applying sufficient pressure to the output blend of line 6 to comform it to the intended cross-sectional dimension of the rod, or wire 8 while compacting and deforming it sufficiently to form product having high integrity, can be used. For instance, the apparatus shown in U.S. Pat. No. 4,041,595, 3,922,898, and 3,911,705 of William G. Voorhes or the apparatus shown in U.S. Pat. No. 3,765,216 of Derek Green can be used for implementing the method according to the present invention. Reference should be had also to Wire Technology Nov. 12, 1976, pages 23-25.

Figure 2:
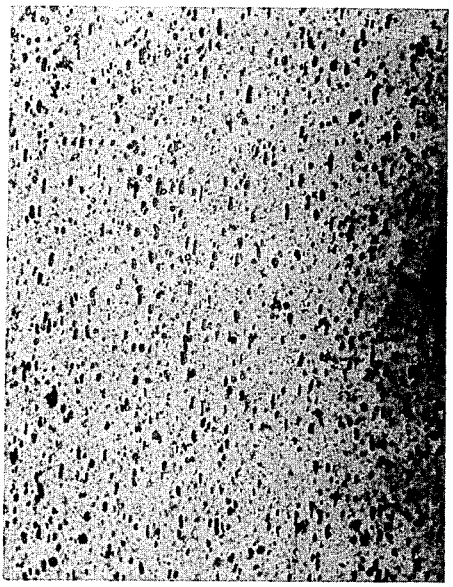
FIG. 2 is a photographic view of the internal grain structure of an alloy filler wire of the prior art involving 5% silicon with the balance aluminum.
Figure 3:
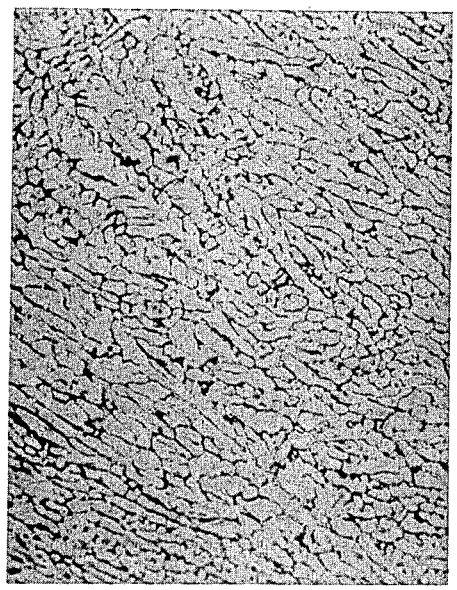
FIG. 3 is a photographic view of the structure of the weld metal obtained when using the filler wire of FIG. 2.
Figure 4:
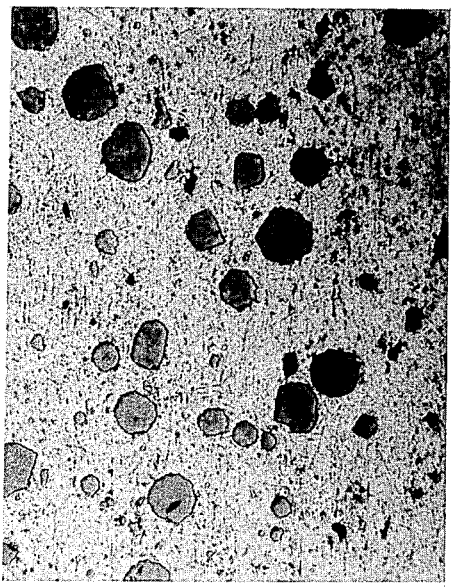
FIG. 4 shows the internal grain structure of a welding filler wire of 5% silicon with the balance aluminum according to the invention.

In the illustrative example of FIG. 1, particulate A is aluminum and B is silicon, the proportion being 5% of silicon. FIG. 2 shows the micrographic representation of a conventionally manufactured filler wire of aluminum 5% silicon alloy. FIG. 3 shows how the composite heat treated alloy of FIG. 2 has been transformed by a quality welding operation. The alloy structure of FIG. 3 represent the final state of the alloy in the welding seam when the welded parts are united. In accordance with the present invention, the same final metallurgical stage is to be reached after welding with a wire, rod, stick or the like of filler material which has received without the application of heat sufficient mechanical qualities to be stored, packed, wound, transported, and fed as a consumable electrode or as a filler wire that can be sold in the open market. FIG. 4 shows the grain structure of such a wire, rod, obtained in accordance with the invention. In contrast to the grain structure of FIG. 2, the silicon particles are coarser and alloying has not taken place yet.

The mechanical characteristics of the filler wire of the Al-Si type shown in FIG. 4 compared with the characteristics of the conventionally manufactured alloy of the same type shown by FIG. 2, are as follows:

| Invention FIG. 4 (diameter .073) | (.2% Offset) Offset Strength (PSI) | Ultimate Tensile Strength (PSI) | Elongation (%) |
|---|---|---|---|
| Sample #1 | 10,900 | 15,900 | 18 |
| Sample #2 | 11,250 | 16,200 | 21 |
| Sample #3 | 10,900 | 16,100 | 19 |
| Prior Art (FIG. 2) (diameter .062) | | | |
| Sample #1 | | 35,990 | 3 |
| Sample #2 | | 33,670 | 5 |
| Sample #3 | | 33,670 | 4 |

It is clear that the alloying method of the prior art for the same basic metallurgical composition (Aluminum - 5% Silicon) permits higher tensile strengths, but has the result of the heat treatment invested at the start. In contrast, the wire according to the invention represents a substantial saving, with adequate mechanical properties even with the lack of heat treatment. A softer but ductile wire is obtained having all the necessary requirements.

The mechanical structure of the filler wire, rod, or stick according to the invention appears to be quite sufficient for storage, packing, transportation, and weldfeed. Therefore, there is no need to pay the higher cost involved in the conventional manufacture of such filler materials. More generally, the filler wire, rod, or stick, according to the invention compares favorably with conventional welding filler material.

FIG. 4 shows the microscopic structure of a cross-section of the Al-5% Si filler wire made according to the present invention. The structure consists of discrete, approximately spherical particles of silicon uniformly distributed in an aluminum matrix.

Figure 5:
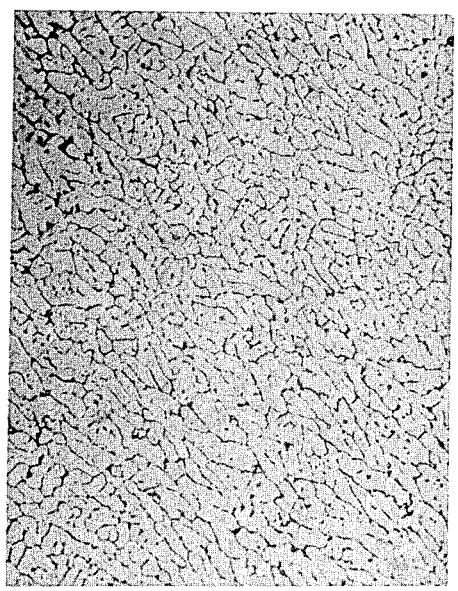
FIG. 5 is a photographic view of the structure of a weld bead obtained during welding utilizing the welding filler wire according to the invention shown in FIG. 4.

FIG. 5 shows the microscopic structure of a sample taken from a bead obtained from consumption of the welding filler wire according to the present invention. Assuming that the aluminum-5% silicon composition of the disclosed filler wire 9 is quantitatively comparable to the basic content of the conventional alloy wire of FIG. 2, the resulting weld bead structures can be compared (FIG. 3 and FIG. 5). Experience has proved that the alloy derived from the disclosed filler wire when it is melted in the welding operation results in a solidified structure similar to that achieved using a conventionally manufactured filler wire.

From a comparison of FIG. 3 and FIG. 5, it is clear that the ultimate alloying step by melting during welding yields the very same alloy microstructure as would be obtained by the detour of preheat treatment before or during forming of the wire, rod or stick in the prior art. The same quality welding has been obtained by a different route. The method according to the present invention is less costly, it does not substantially lose anything in producing a wire, rod, or stick which is a staple article. The filler rod or consumable electrode, so obtained can be identified in terms of the final alloy composition, or particular welding oeration, with or without fluxing agent.

By the same method, fluxing agent in particulated form may be added, mixed and compacted with the constituents of the intended welding filler. It has been determined that such addition of fluxing agent will not impair the quality of the alloy obtained at the welding stage, and will provide during welding the improved effectiveness usually achieved when an appropriate fluxing agent is present during welding.

What is claimed is:

1. A consumable electrode of predetermined length and cross-section obtained as a staple article by the following steps:
    selecting particulated metals, said metals being constituents of an alloy system suitable for a predetermined welding process;
    adding and blending said particulated metals in proportions defined by said alloy system;
    extruding and conforming the blended particulated metals to said predetermined cross-section and for said predetermined length under a mechanical pressure sufficient to generate a bendable composite unitary body having definite mechanical characteristics in several directions including mechanical strength and ductility;
    said steps being short of any heating process and of any chemical union of any of the particulated metals whereby said composite body is obtained as a staple article of said length and cross-section which is susceptible when used as a consumable electrode of yielding in situ under said welding process an alloy conforming to said alloy system.

2. The consumable electrode of claim 1 with at least one fluxing agent in particulated form being added and blended with said particulated metals at said adding and blending step.

3. The consumable electrode of claim 1 with said metal constituents including at least 5% silicon in powder form, the rest being aluminum in particulated form.

* * * * *